US011711286B2

(12) United States Patent
Novotny et al.

(10) Patent No.: US 11,711,286 B2
(45) Date of Patent: Jul. 25, 2023

(54) COMPLIANCE MECHANISMS IN BLOCKCHAIN NETWORKS

(71) Applicant: International Business Machines Corporation, Armonk, NY (US)

(72) Inventors: Petr Novotny, Mount Kisco, NY (US); Jeronimo Irazabal, Roque Perez (AR); Nitin Gaur, Round Rock, TX (US); Dulce B. Ponceleon, Palo Alto, CA (US)

(73) Assignee: International Business machines Corporation, Armonk, NY (US)

(*) Notice: Subject to any disclaimer, the term of this patent is extended or adjusted under 35 U.S.C. 154(b) by 341 days.

(21) Appl. No.: 17/033,850

(22) Filed: Sep. 27, 2020

(65) Prior Publication Data
US 2022/0103453 A1 Mar. 31, 2022

(51) Int. Cl.
*H04L 12/24* (2006.01)
*H04L 12/26* (2006.01)
*H04L 29/06* (2006.01)
*H04L 43/50* (2022.01)
*H04L 9/40* (2022.01)
*H04L 41/28* (2022.01)

(52) U.S. Cl.
CPC .............. *H04L 43/50* (2013.01); *H04L 41/28* (2013.01); *H04L 63/101* (2013.01)

(58) Field of Classification Search
CPC ... H04L 9/00; H04L 9/50; H04L 41/00; H04L 41/04; H04L 41/042–052; H04L 41/08; H04L 41/0803; H04L 41/084; H04L 41/0876–0886; H04L 41/0894; H04L 41/28; H04L 63/00; H04L 63/08; H04L 63/10; H04L 63/101
See application file for complete search history.

(56) References Cited

U.S. PATENT DOCUMENTS

| | | | | |
|---|---|---|---|---|
| 9,015,832 | B1* | 4/2015 | Lachwani | G06F 21/52 726/22 |
| 11,023,218 | B1* | 6/2021 | Lu | G06F 21/577 |
| 2013/0166431 | A1 | 6/2013 | Coglianese et al. | |
| 2014/0351129 | A1 | 11/2014 | Finot | |
| 2015/0324787 | A1 | 11/2015 | Schaffner | |
| 2016/0300222 | A1 | 10/2016 | Yang | |
| 2017/0046651 | A1 | 2/2017 | Lin et al. | |
| 2017/0046652 | A1 | 2/2017 | Haldenby et al. | |

(Continued)

FOREIGN PATENT DOCUMENTS

| | | | | |
|---|---|---|---|---|
| CN | 109729092 A | * | 5/2019 | |
| WO | WO-2014202930 A1 | * | 12/2014 | G06F 11/3692 |
| WO | 2016003480 A1 | | 1/2016 | |

OTHER PUBLICATIONS

Rousey, "A Complete Guide to the Proof of Authority POA Algorithm" (Year: 2019).*

(Continued)

*Primary Examiner* — Boris D Grijalva Lobos
(74) *Attorney, Agent, or Firm* — Jared C. Chaney

(57) ABSTRACT

A node in a blockchain network may agree, on an authority accept a compliance module from the authority, accept the compliance module. The node may also receive an operation, verify a compliance of the operation based on the compliance module, add the verified operation to a ledger on the blockchain network.

17 Claims, 14 Drawing Sheets

(56) References Cited

U.S. PATENT DOCUMENTS

| | | |
|---|---|---|
| 2019/0188712 A1 | 6/2019 | Fedorov |
| 2019/0303932 A1* | 10/2019 | Klaedtke ............... H04L 9/0637 |
| 2020/0028691 A1 | 1/2020 | Rao |
| 2020/0252457 A1* | 8/2020 | Zakrzewski .......... H04L 9/3213 |
| 2020/0322137 A1* | 10/2020 | Arumugam ........... H04L 63/123 |
| 2020/0396065 A1* | 12/2020 | Gutierrez-Sheris .......................... H04L 9/3297 |
| 2021/0211468 A1* | 7/2021 | Griffin .................... H04L 63/20 |

OTHER PUBLICATIONS

United Kingdom Exam Report and Written Opinion dated Mar. 1, 2022, for Application No. GB2113212. I.

Mahindrakar et al., "Automating GDPR Compliance using Policy Integrated Blockchain," In proceedings of 6th IEEE International Conference on Big Data Security on Cloud (BigDataSecurity 2020), May 2020, 8 pages.

Charles et al., "Blockchain Compliance by Design: Regulatory Considerations for Blockchain in Clinical Research," Frontiers in Blockchain, Nov. 8, 2019, 18 pages, doi: 10.3389/fbloc.2019.00018.

Choudhury et al., "A Blockchain Framework for Managing and Monitoring Data in Multi-Site Clinical Trials," arXiv:1902.03975v1 [cs.DB], Feb. 11, 2019, 13 pages.

"Watson Discovery understands the language of your business," IBM, Watson Discovery, Printed Sep. 25, 2020, 10 pages, https://www.ibm.com/cloud/compare-and-comply.

"About Compare and Comply," IBM, Last Updated Nov. 11, 2019, 3 pages https://cloud.ibm.com/docs/compare-comply?topic=compare-comply-about#about.

"Getting started with Compare and Comply," IBM, Last Updated Feb. 3, 2020, 10 pages https://cloud.ibm.com/docs/compare-comply?topic=compare-comply-getting-started.

"Using Discovery for Content Intelligence," IBM, Last Updated Jul. 15, 2020, 4 pages https://cloud.ibm.com/docs/discovery-data?topic=discovery-data-output_schema.

\* cited by examiner

490

Block$_i$

Header 472$_i$

- Hash Value of Previous Block
- Reference Information

File(s) (and Metadata) 474$_i$

| Data 1 | REF 1 | Metadata 1 |
| Data 2 | REF 2 | Metadata 2 |
| . | . | . |
| . | . | . |
| . | . | . |
| . | . | . |
| . | . | . |
| Data N | REF N | Metadata N |

Value 476$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 4D

COMPLIANCE MECHANISMS IN BLOCKCHAIN NETWORKS

BACKGROUND

The present disclosure relates generally to the field of digital asset transfer smart contracts, and more specifically to coextended compliance in blockchain networks.

Blockchains offer immutability of data by replicating data across all nodes of a network. In order to be able to validate the blockchain, nodes must have access to the complete history of transactions, which any data on the chain is visible for all participants.

The movement of digital assets or crypto assets is governed by smart contracts or some sort of business rules encoded in smart contracts and/or chain code between two parties or business entities. These smart contracts act as glue to ensure all conditions are met when the asset is transferred. Smart contracts also provide governance layers to ensure all conditions are met and the liabilities and responsibilities of the systems are enforced to facilitate a digital transaction system.

SUMMARY

Embodiments of the present disclosure include a method, system, and computer program product for compliance mechanisms in blockchain networks.

Some embodiments of the present disclosure can be illustrated by a method comprising, agreeing, by a node in a blockchain network, on an authority, receiving, by the node, a compliance module from the authority, and accepting, by the node, the compliance module.

Some embodiments of the present disclosure can also be illustrated by a system comprising a memory, and a processor in communication with the memory, the processor being configured to perform operations comprising agreeing on an authority for the blockchain network, receiving a compliance module from the authority, and accepting the compliance module.

Some embodiments of the present disclosure can also be illustrated by a computer program product comprising a computer readable storage medium having program instructions embodied therewith, the program instructions executable by a processor to cause the processors to perform a function, the function comprising agreeing on an authority for a blockchain network, receiving a compliance module from the authority, and accepting the compliance module.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 4D illustrates a block which may represent the structure of blocks in the blockchain, according to example embodiments.

Figure 1:
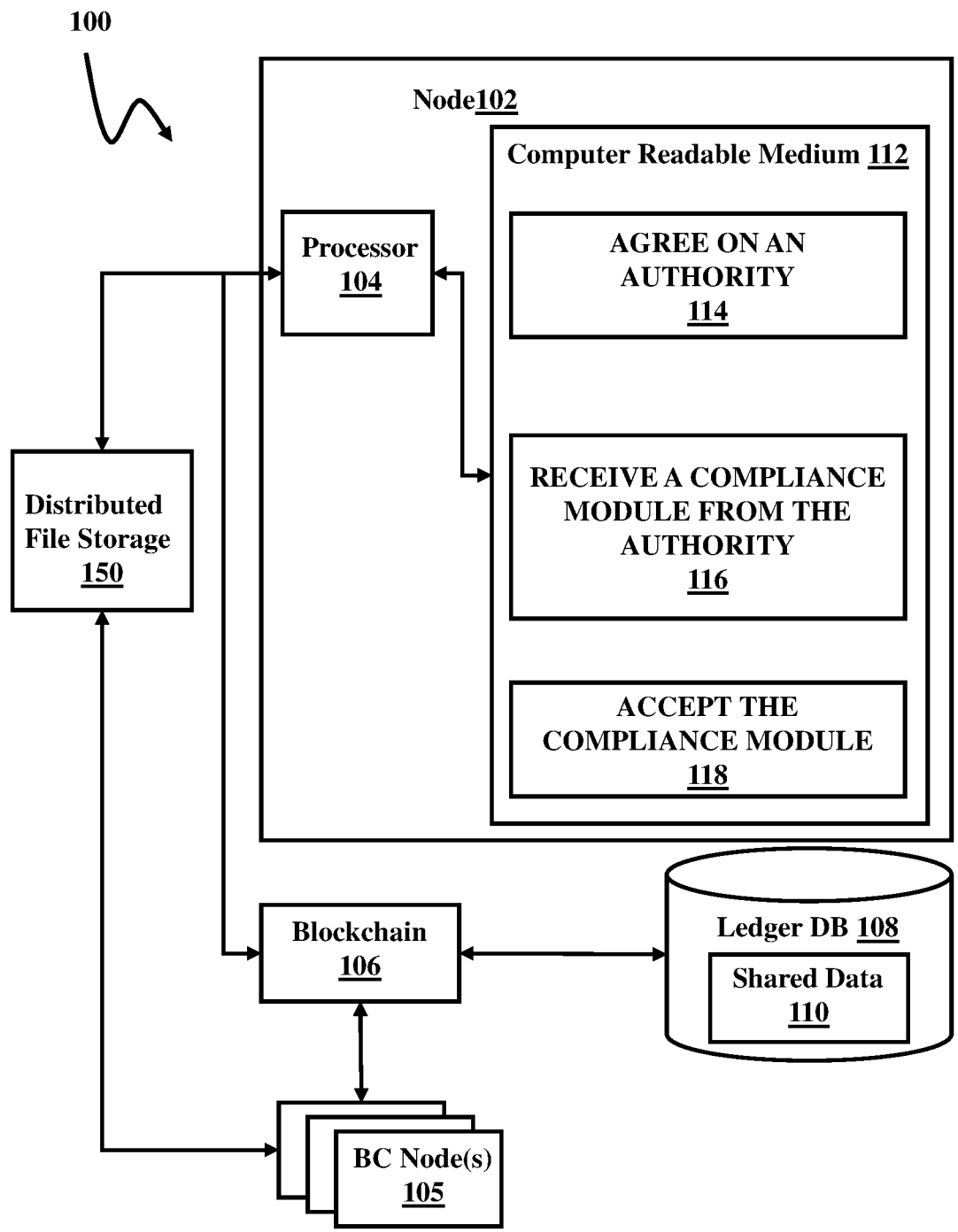
FIG. 1 illustrates a network diagram of a system including a database, according to an example embodiment.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of due diligence for digital asset transfers in multiple jurisdictions, and more specifically to coextended compliance in blockchain networks.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize blockchain (e.g., Hyperledger Fabric) channels, and smart contracts that implement logic based on a non-interactive zero knowledge proof.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method, system, and computer program product for compliance mechanisms in blockchain networks. The exemplary embodiments solve the issues of reliability, time, and trust by extending features of a database such as immutability, digital signatures, and being a single source of truth. The exemplary embodiments provide a solution for compliance and accounting of transactions. The blockchain networks may be homogenous based on the asset type and rules that govern the assets based on the smart contracts.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for compliance mechanisms in blockchain networks. Also, use of the encryption in the blockchain provides security and builds trust. The smart contract manages the state of the asset to complete the life-cycle, thus specialized nodes may ensure that blockchain operations with compliance requirements. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database may not be useful to implement the example embodiments because a traditional database does not bring all parties on the network, a traditional database does not create trusted collaboration, and a traditional database does not provide for an efficient method of data compliance. The traditional database does not provide for a tamper proof storage and does not provide for preservation of the due diligence and compliance. Accordingly, the example embodiments provide for a specific solution to a problem in the arts/field of compliance for transactions.

FIG. 1 illustrates a logic network diagram for smart data annotation in blockchain networks, according to example embodiments.

Referring to FIG. 1, the example network 100 includes a node 102 connected to other blockchain (BC) nodes 105 representing document-owner organizations. The node 102 may be connected to a blockchain 106 that has a ledger 108 for storing data to be shared (110) among the nodes 105. While this example describes in detail only one node 102, multiple such nodes may be connected to the blockchain 106. It should be understood that the node 102 may include additional components and that some of the components described herein may be removed and/or modified without departing from a scope of the node 102 disclosed herein. The node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the node 102 may include multiple processors, multiple cores, or the like, without departing from the scope of the node 102 system. A distributed file storage 150 may be accessible to processor node 102 and other BC nodes 105. The distributed file storage may be used to store documents identified in ledger (distributed file storage) 150.

The node 102 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute the machine-readable instructions 114 to agree on an authority. As discussed above, the blockchain ledger 108 may store data to be shared among the nodes 105. The blockchain 106 network may be configured to use one or more smart contracts that manage transactions for multiple participating nodes. Documents linked to the annotation information may be stored in distributed file storage 150. The processor 104 may execute the machine-readable instructions 116 to receive a compliance module from the authority. The processor 104 may execute the machine-readable instructions 118 accept the compliance module.

Figure 2A:
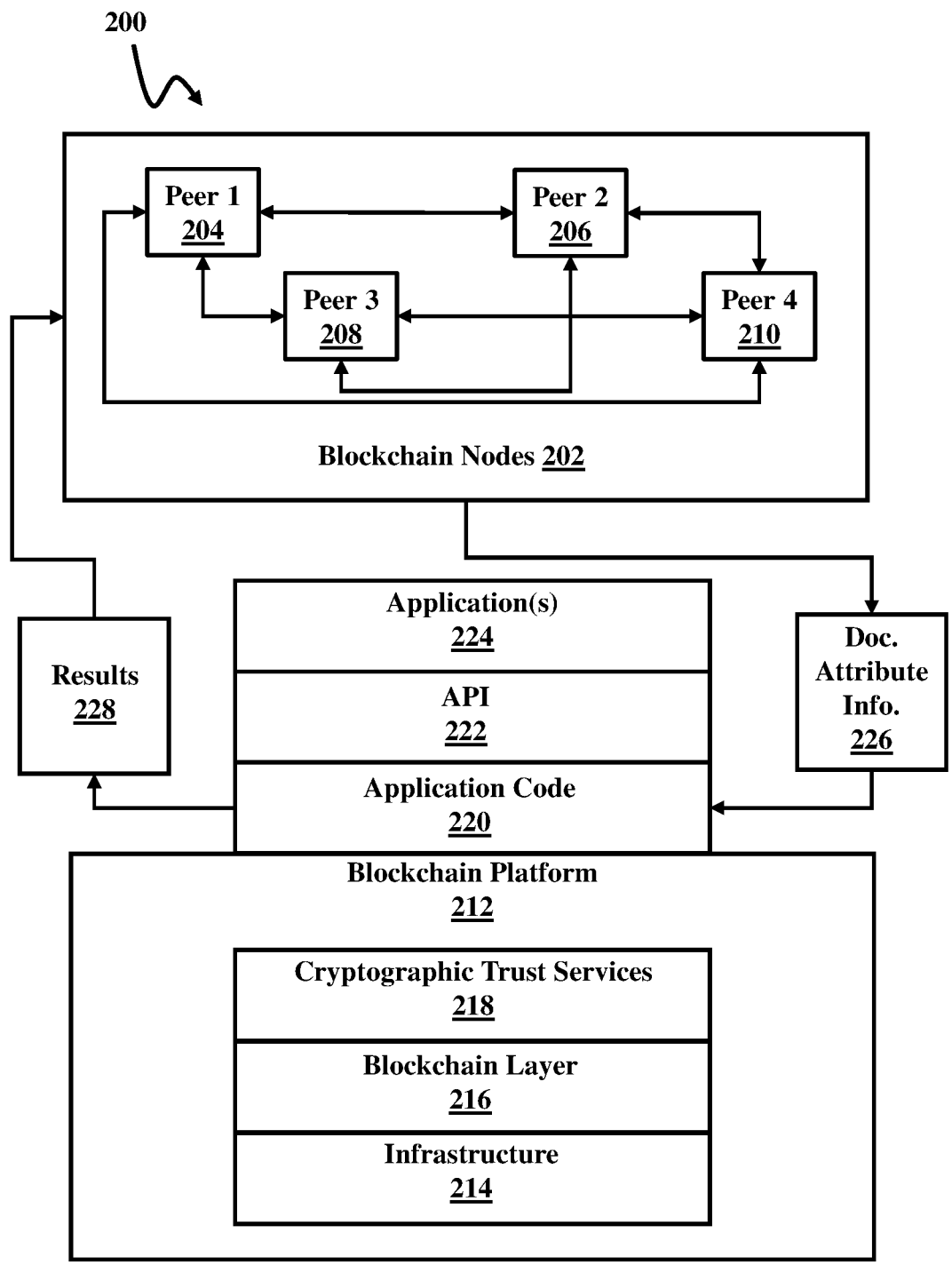
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more peer nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
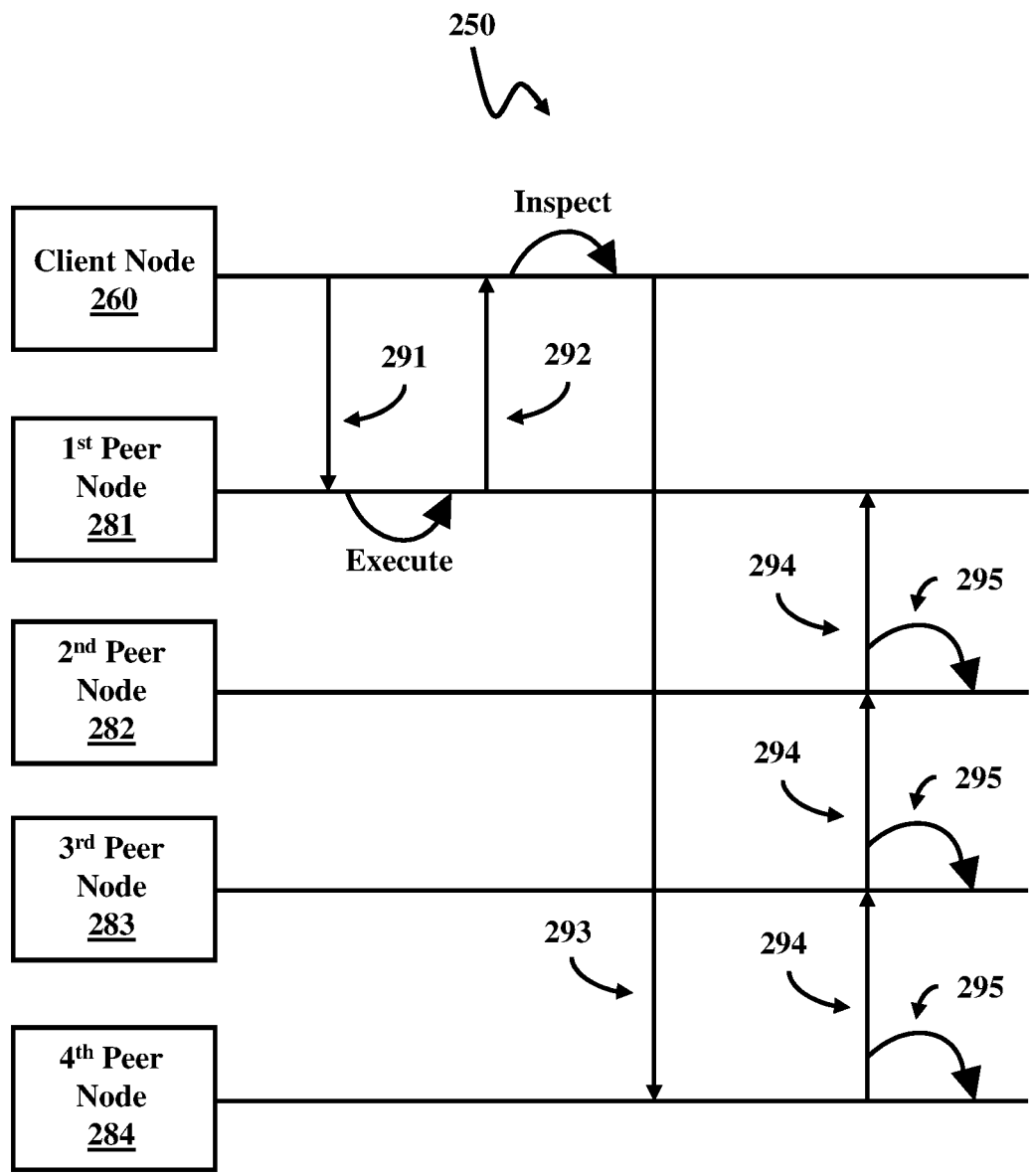
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B a general description of transactional flow 250 will be given followed by a more specific example. The transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293. In some embodiments, one or more of the peers may be the manager nodes.

A more specific description of transactional flow 250 can be understood with a more specific example. To begin, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering service node 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 260 assembles endorsements into a transaction 293 and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in operation 295 each peer node 281-283 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 3A:
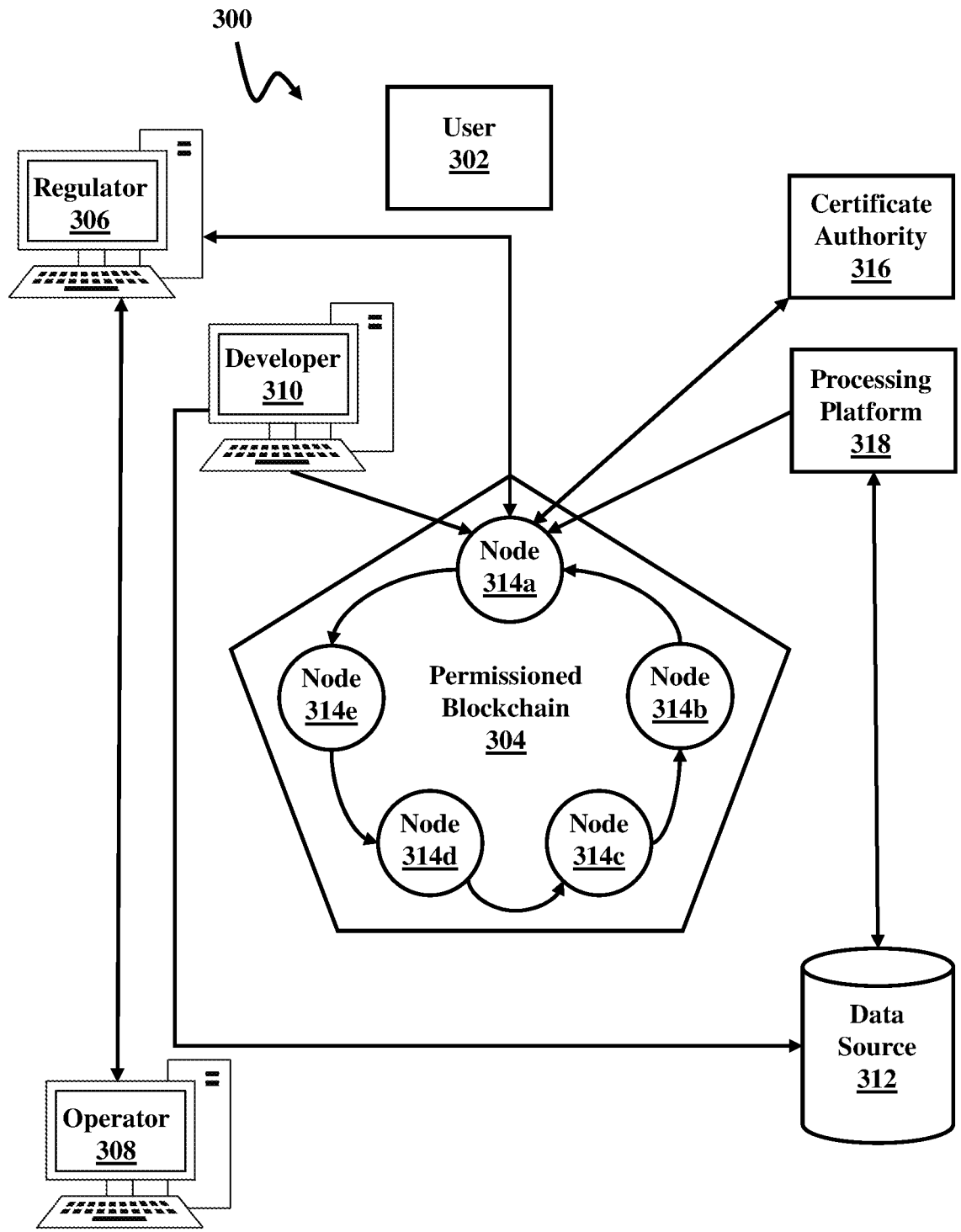
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client." An auditor may be restricted only to querying the ledger whereas a client may be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 may use an out-of-band connection to access the data. In this example, the blockchain user 302 connects to the permissioned blockchain 304 through one of peer nodes 314 (referring to any one of nodes 314a-e). Before proceeding with any transactions, the peer node 314 (e.g., node 314a) retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
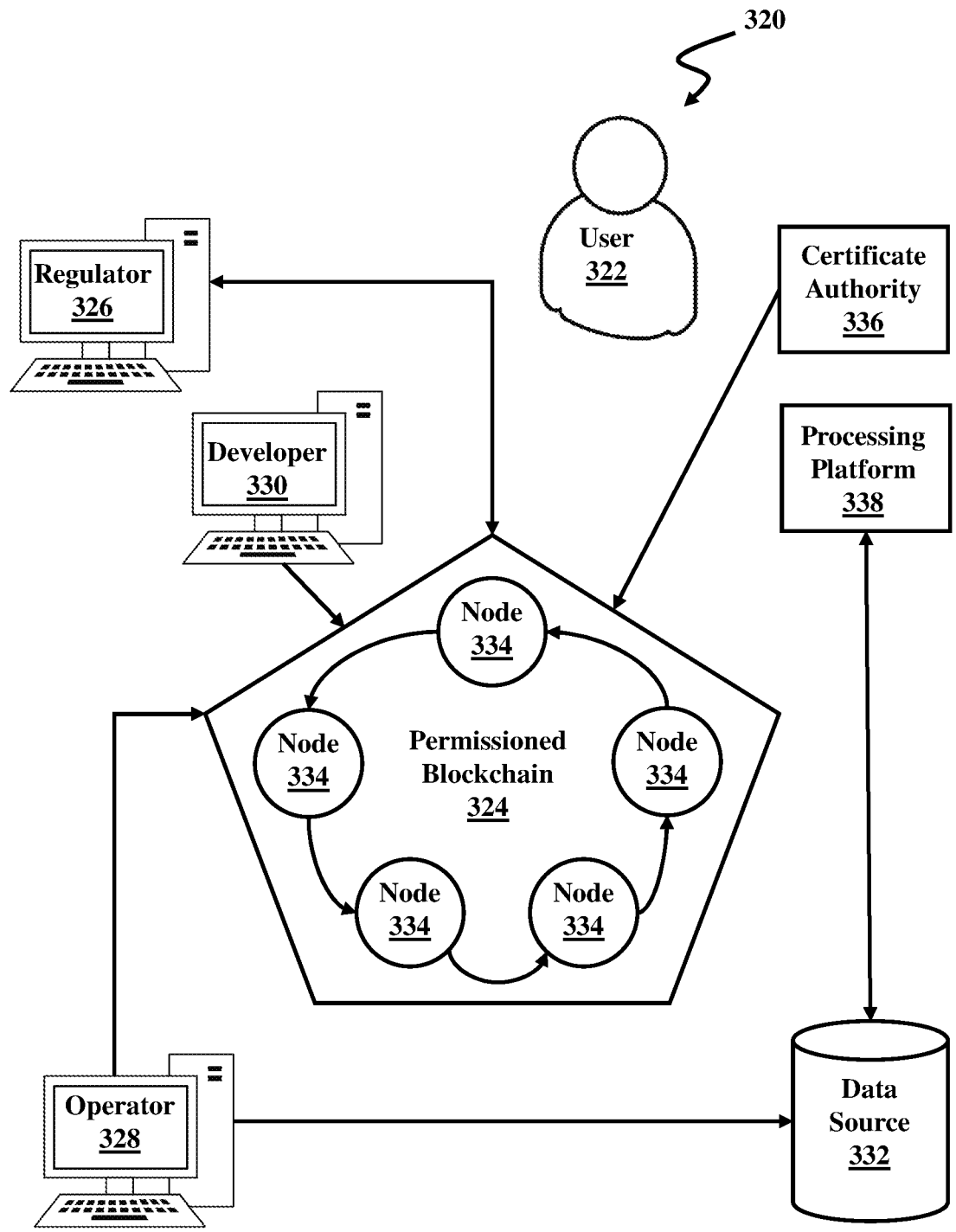
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor may be restricted to only querying the ledger whereas a client may be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 may use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments of the present disclosure, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
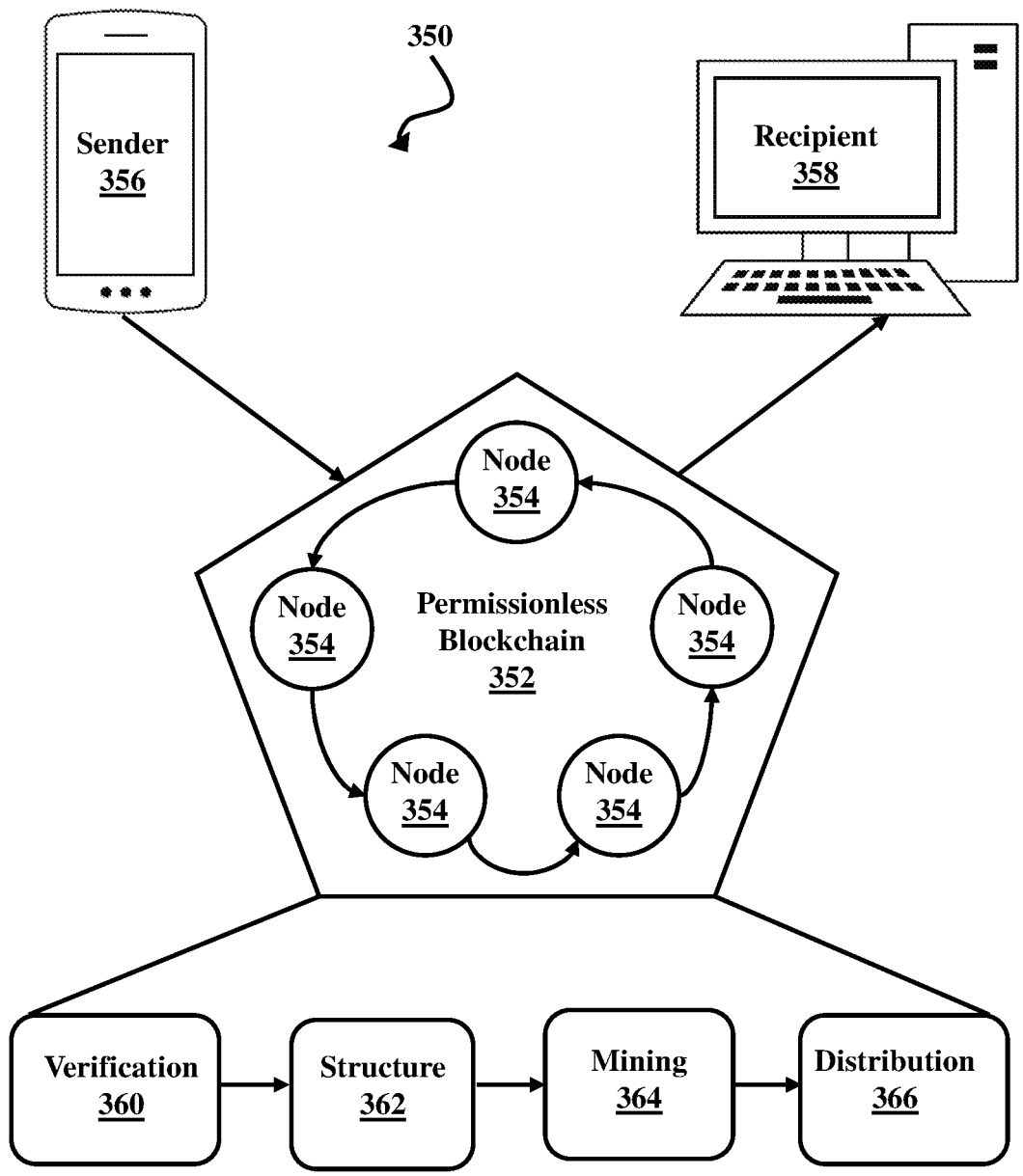
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In some embodiments, each of the sender device 356 and the recipient device 358 may have digital wallets (associated with the blockchain 352) that provide user interface controls and a display of transaction parameters. In response, the transaction is broadcast throughout the blockchain 352 to the nodes 354.

Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
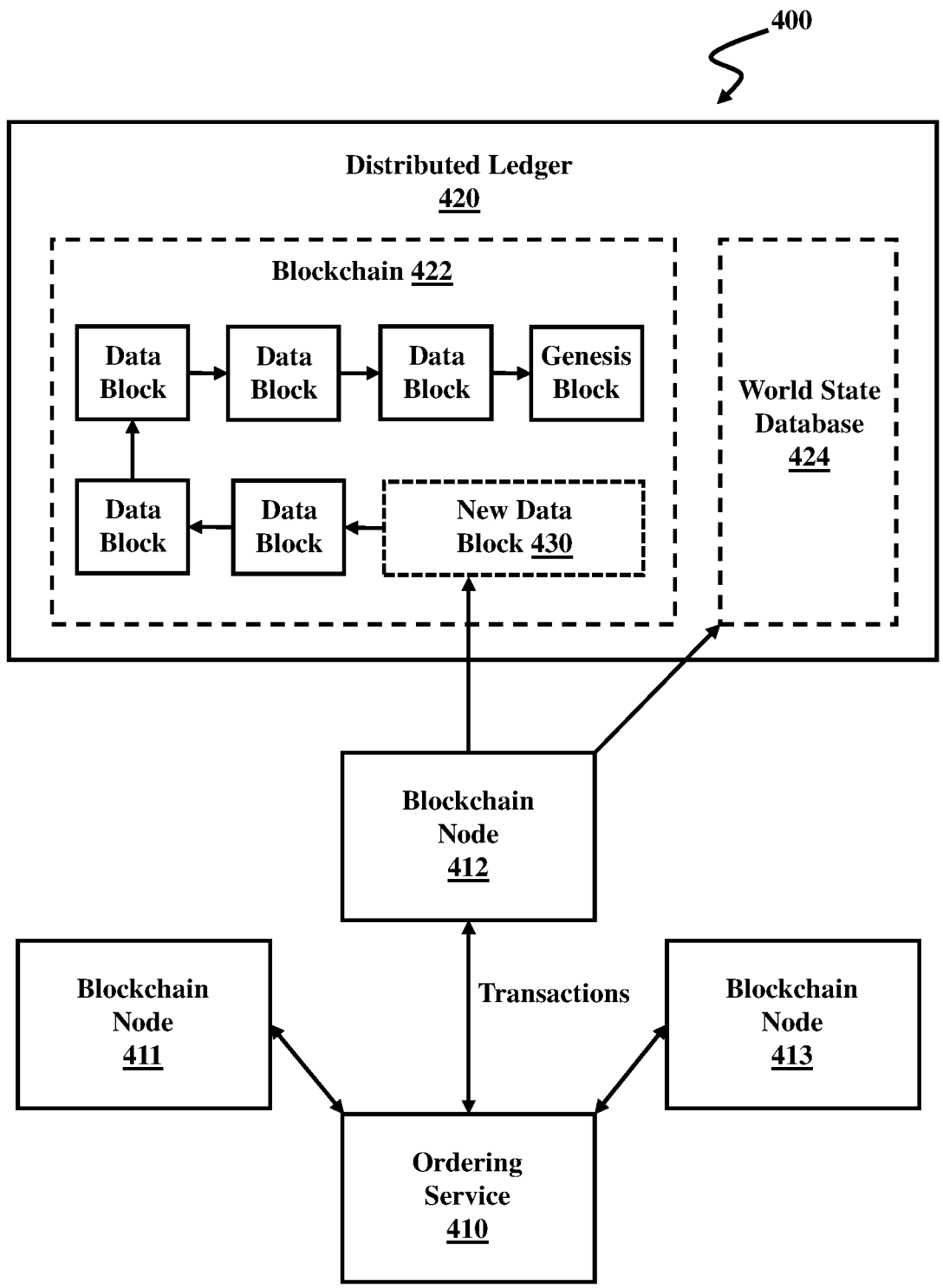
FIG. 4A illustrates a process for a new block being added to a distributed ledger, according to example embodiments.
Figure 4B:
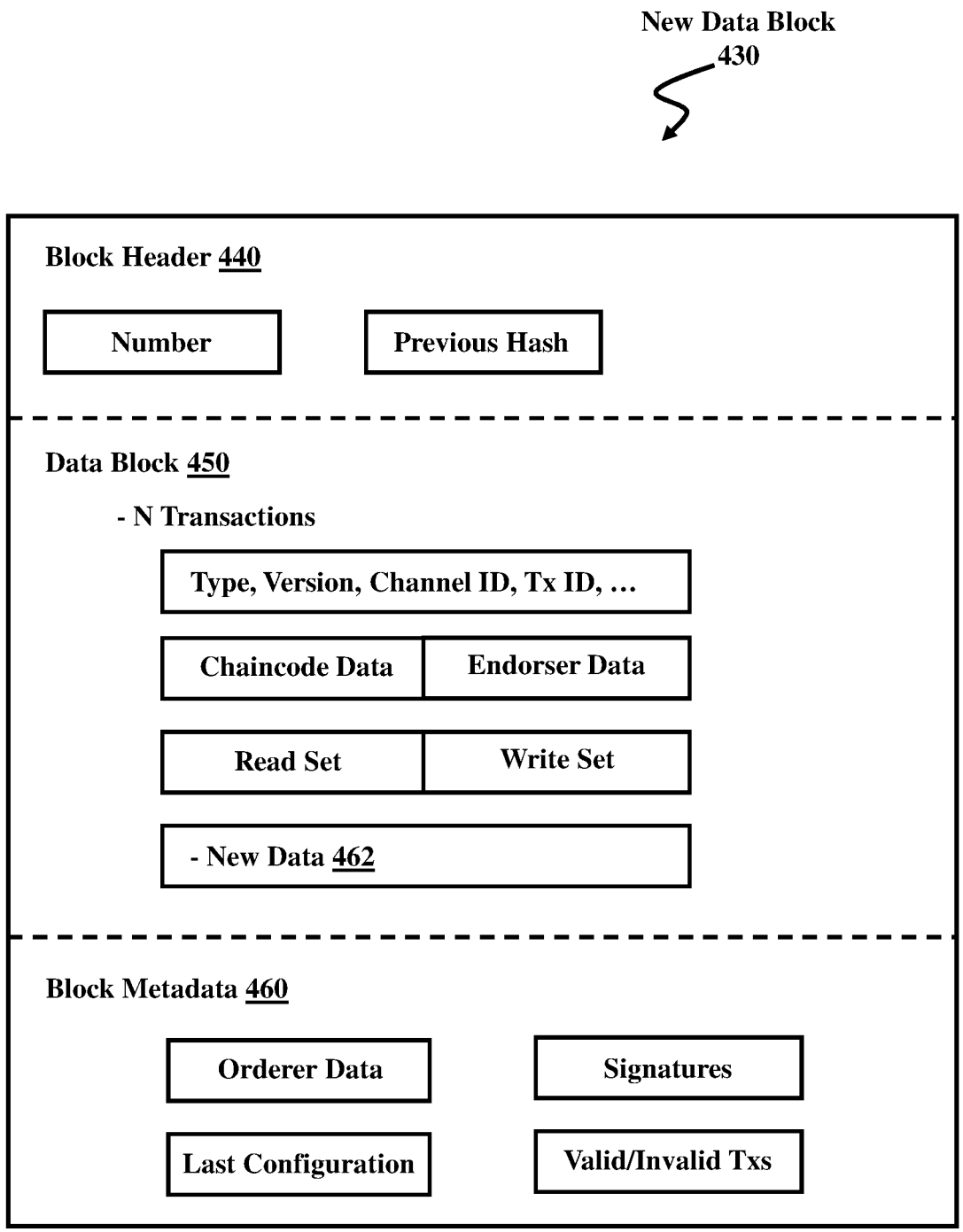
FIG. 4B illustrates contents of a new data block, according to example embodiments.

FIG. 4A illustrates a process 400 of a new block being added to a distributed ledger 420, according to example embodiments, and FIG. 4B illustrates contents of a new data block structure 430 for blockchain, according to example embodiments. The new data block 430 may contain document linking data.

Referring to FIG. 4A, clients (not shown) may submit transactions to blockchain nodes 411, 412, and/or 413. Clients may be instructions received from any source to enact activity on the blockchain 420. As an example, clients may be applications that act on behalf of a requester, such as a device, person or entity to propose transactions for the blockchain. The plurality of blockchain peers (e.g., blockchain nodes 411, 412, and 413) may maintain a state of the blockchain network and a copy of the distributed ledger 420. Different types of blockchain nodes/peers may be present in the blockchain network including endorsing peers which simulate and endorse transactions proposed by clients and committing peers which verify endorsements, validate transactions, and commit transactions to the distributed ledger 420. In this example, the blockchain nodes 411, 412, and 413 may perform the role of endorser node, committer node, or both.

The distributed ledger 420 includes a blockchain which stores immutable, sequenced records in blocks, and a state database 424 (current world state) maintaining a current state of the blockchain 422. One distributed ledger 420 may exist per channel and each peer maintains its own copy of the distributed ledger 420 for each channel of which they are a member. The blockchain 422 is a transaction log, structured as hash-linked blocks where each block contains a sequence of N transactions. Blocks may include various components such as shown in FIG. 4B. The linking of the blocks (shown by arrows in FIG. 4A) may be generated by adding a hash of a prior block's header within a block header of a current block. In this way, all transactions on the blockchain 422 are sequenced and cryptographically linked together preventing tampering with blockchain data without breaking the hash links. Furthermore, because of the links, the latest block in the blockchain 422 represents every transaction that has come before it. The blockchain 422 may be stored on a peer file system (local or attached storage), which supports an append-only blockchain workload.

The current state of the blockchain 422 and the distributed ledger 420 may be stored in the state database 424. Here, the current state data represents the latest values for all keys ever included in the chain transaction log of the blockchain 422. Chaincode invocations execute transactions against the current state in the state database 424. To make these chaincode interactions extremely efficient, the latest values of all keys are stored in the state database 424. The state database 424 may include an indexed view into the transaction log of the blockchain 422, it can therefore be regenerated from the chain at any time. The state database 424 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 410.

The ordering service 410 accepts endorsed transactions, orders them into a block, and delivers the blocks to the committing peers. For example, the ordering service 410 may initiate a new block when a threshold of transactions has been reached, a timer times out, or another condition. In the example of FIG. 4A, blockchain node 412 is a committing peer that has received a new data new data block 430 for storage on blockchain 420. The first block in the blockchain may be referred to as a genesis block which includes information about the blockchain, its members, the data stored therein, etc.

The ordering service 410 may be made up of a cluster of orderers. The ordering service 410 does not process transactions, smart contracts, or maintain the shared ledger. Rather, the ordering service 410 may accept the endorsed transactions and specifies the order in which those transactions are committed to the distributed ledger 420. The architecture of the blockchain network may be designed such that the specific implementation of 'ordering' (e.g., Solo, Kafka, BFT, etc.) becomes a pluggable component.

Transactions are written to the distributed ledger 420 in a consistent order. The order of transactions is established to ensure that the updates to the state database 424 are valid when they are committed to the network. Unlike a cryptocurrency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service 410 initializes a new data block 430, the new data block 430 may be broadcast to committing peers (e.g., blockchain nodes 411, 412, and 413). In response, each committing peer validates the transaction within the new data block 430 by checking to make sure that the read set and the write set still match the current world state in the state database 424. Specifically, the committing peer can determine whether the read data that existed when the endorsers simulated the transaction is identical to the current world state in the state database 424. When the committing peer validates the transaction, the transaction is written to the blockchain 422 on the distributed ledger 420, and the state database 424 is updated with the write data from the read-write set. If a transaction fails, that is, if the committing peer finds that the read-write set does not match the current world state in the state database 424, the transaction ordered into a block may still be included in that block, but it may be marked as invalid, and the state database 424 may not be updated.

Referring to FIG. 4B, a new data block 430 (also referred to as a data block) that is stored on the blockchain 422 of the distributed ledger 420 may include multiple data segments such as a block header 440, block data 450, and block metadata 460. It should be appreciated that the various depicted blocks and their contents, such as new data block 430 and its contents. Shown in FIG. 4B are merely examples and are not meant to limit the scope of the example embodiments. The new data block 430 may store transactional information of N transaction(s) (e.g., 1, 10, 100, 500, 1000, 2000, 3000, etc.) within the block data 450. The new data block 430 may also include a link to a previous block (e.g., on the blockchain 422 in FIG. 4A) within the block header 440. In particular, the block header 440 may include a hash of a previous block's header. The block header 440 may also include a unique block number, a hash of the block data 450 of the new data block 430, and the like. The block number of the new data block 430 may be unique and assigned in various orders, such as an incremental/sequential order starting from zero.

The block data 450 may store transactional information of each transaction that is recorded within the new data block 430. For example, the transaction data may include one or more of a type of the transaction, a version, a timestamp, a channel ID of the distributed ledger 420, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 450 may also store new data 462 which adds additional information to the hash-linked chain of blocks in the blockchain 422. The additional information includes one or more of the steps, features, processes and/or actions described or depicted herein. Accordingly, the new data 462 can be stored in an immutable log of blocks on the distributed ledger 420. Some of the benefits of storing such new data 462 are reflected in the various embodiments disclosed and depicted herein. Although in FIG. 4B the new data 462 is depicted in the block data 450 but may also be located in the block header 440 or the block metadata 460. The new data 462 may include a document composite key that is used for linking the documents within an organization.

The block metadata 460 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 410. Meanwhile, a committer of the block (such as blockchain node 412) may add validity/invalidity information based on an endorsement policy, verification of read/write sets, and the like. The transaction filter may include a byte array of a size equal to the number of transactions in the block data 450 and a validation code identifying whether a transaction was valid/invalid.

Figure 4C:
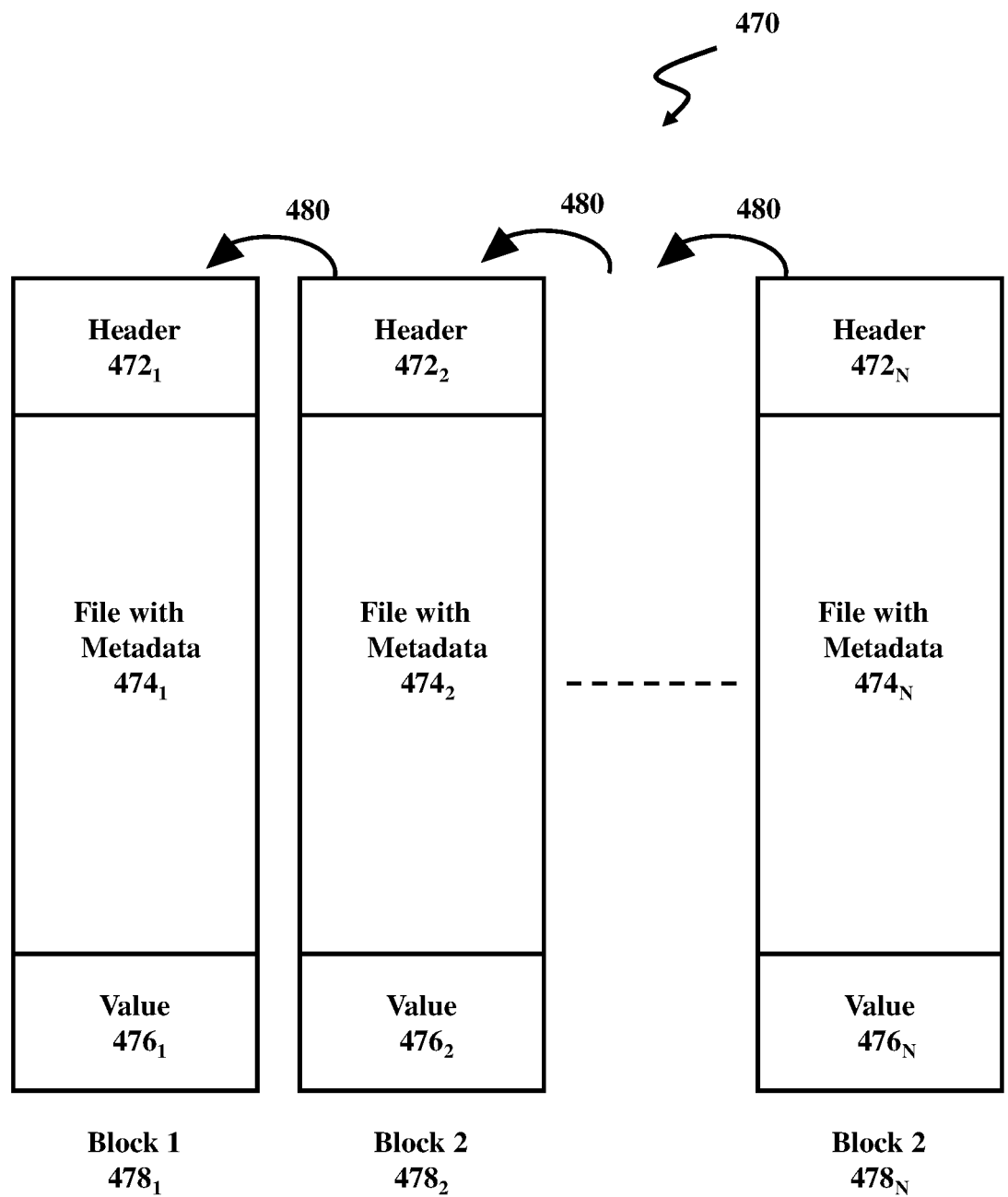
FIG. 4C illustrates a blockchain for digital content, according to example embodiments.

FIG. 4C illustrates an embodiment of a blockchain 470 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 4C, the blockchain 470 includes a number of blocks 4781, 4782, . . . 478N cryptographically linked in an ordered sequence, where N≥1. The encryption used to link the blocks 4781, 4782, . . . 478N may be any of a number of keyed or un-keyed Hash functions. In some embodiments, the blocks 4781, 4782, . . . 478N are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In other embodiments, the blocks 4781, 4782, . . . , 478N may be cryptographically linked by a function that is different from a hash function. For purposes of illustration, the following description is made with reference to a hash function, e.g., SHA-2.

Each of the blocks 4781, 4782, . . . , 478N in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block 4781 in the blockchain is referred to as the genesis block and includes the header 4721, original file 4741, and an initial value 4761. The hashing scheme used for the genesis block, and indeed in all subsequent blocks, may vary. For example, all the information in the first block 4781 may be hashed together and at one time, or each or a portion of the information in the first block 4781 may be separately hashed and then a hash of the separately hashed portions may be performed.

The header 4721 may include one or more initial parameters, which, for example, may include a version number, timestamp, nonce, root information, difficulty level, consensus protocol, duration, media format, source, descriptive keywords, and/or other information associated with original file 4741 and/or the blockchain. The header 4721 may be generated automatically (e.g., by blockchain network managing software) or manually by a blockchain participant. Unlike the header in other blocks 4782 to 478N in the blockchain, the header 4721 in the genesis block does not reference a previous block, simply because there is no previous block.

The original file 4741 in the genesis block may be, for example, data as captured by a device with or without processing prior to its inclusion in the blockchain. The original file 4741 is received through the interface of the system from the device, media source, or node. The original file 4741 is associated with metadata, which, for example, may be generated by a user, the device, and/or the system processor, either manually or automatically. The metadata may be included in the first block 4781 in association with the original file 4741.

The value 4761 in the genesis block is an initial value generated based on one or more unique attributes of the original file 4741. In some embodiments, the one or more unique attributes may include the hash value for the original file 4741, metadata for the original file 4741, and other information associated with the file. In one implementation, the initial value 4761 may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks 4782 to 478N in the blockchain also have headers, files, and values. However, unlike header 4721 the first block, each of the headers 4722 to 472N in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 480, to establish an auditable and immutable chain-of-custody.

Each of the header 4722 to 472N in the other blocks may also include other information, e.g., version number, timestamp, nonce, root information, difficulty level, consensus protocol, and/or other parameters or information associated with the corresponding files and/or the blockchain in general.

The files 4742 to 474N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 4762 to 476N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In some embodiments, the value of a previous block may be updated (e.g., a new hash value computed) to form the value of a current block when any one or more of the following occurs. The new hash value may be computed by hashing all or a portion of the information noted below, in this example embodiment.
  a) new SHA-2 computed hash value if the file has been processed in any way (e.g., if the file was redacted, copied, altered, accessed, or some other action was taken)
  b) new storage location for the file
  c) new metadata identified associated with the file
  d) transfer of access or control of the file from one blockchain participant to another blockchain participant FIG. 4D illustrates an embodiment of a block which may represent the structure of the blocks in the blockchain 490 in accordance with one embodiment. The block, Blocki, includes a header 472*i*, a file 474*i*, and a value 476*i*.

The header 472*i* includes a hash value of a previous block Blocki−1 and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 474*i* includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , REFN to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 476*i* is a hash value or other value computed based on any of the types of information previously discussed. For example, for any given block Blocki, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 470 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
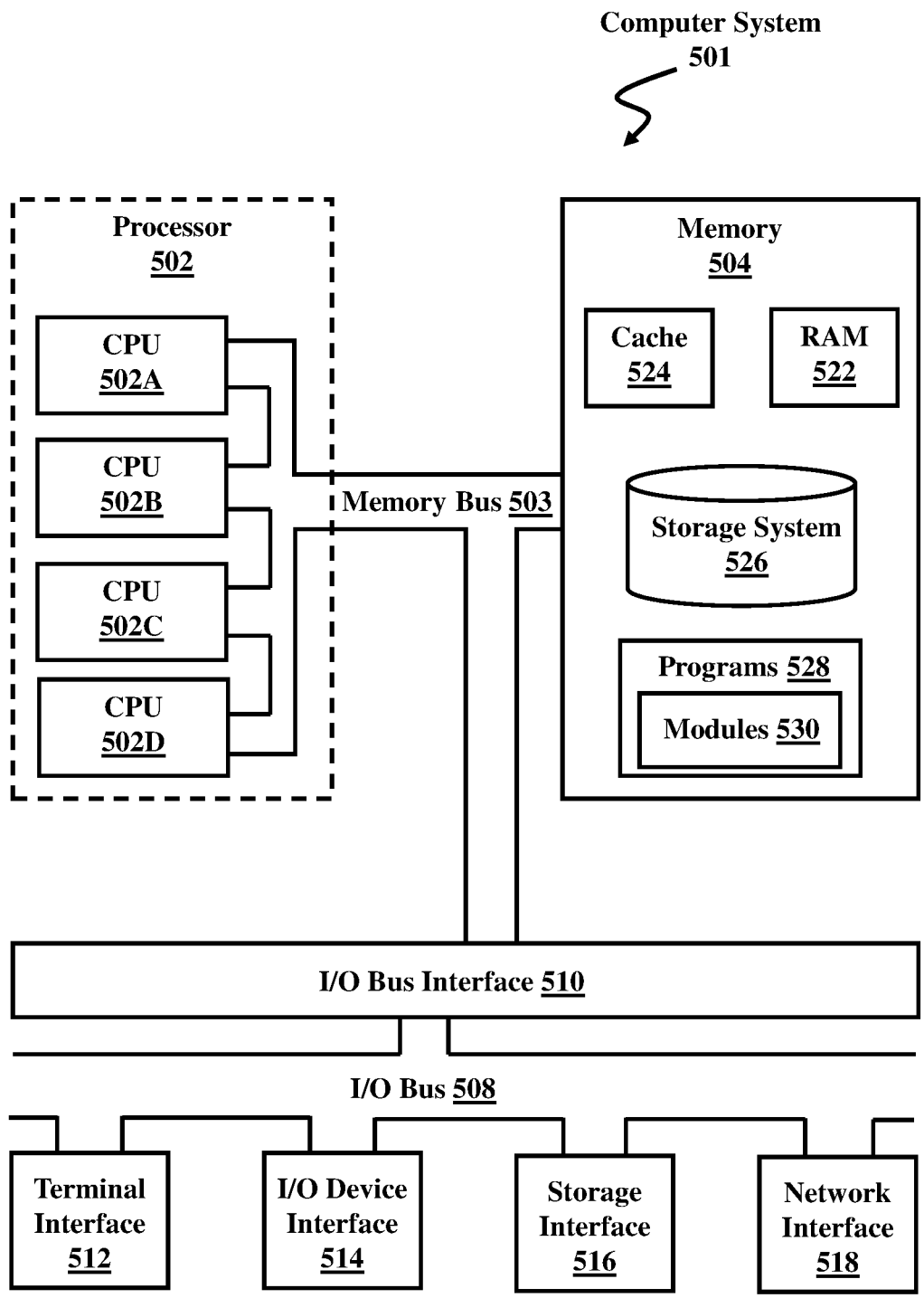
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Data compliance is an important task in many industries allowing verification and enforcement of regulatory, contractual, business, and other types of rules. For example, movement of digital assets or crypto assets may be governed by smart contracts, business rules encoded in smart contracts, and/or chain code between two parties (e.g., business entities). Blockchain processes (such as those handling smart contracts) may be used to ensure all conditions are met when the asset is transferred. Blockchain processes may also provide governance layers to ensure all compliance requirements are met and responsibilities of the systems are fulfilled. However, data compliance can be a difficult task because developers responsible for creating the systems may not have the knowledge base to define all of the rules associated with compliance. While the network itself is a digital network and transaction system, the non-digital elements (such as a business location, entity registration, and legal entity identifiers) play a crucial role in determining the rules and doctrine that may need to be comported with. It is a daunting task for each organization to ensure that they are meeting the due diligence requirements for each participant and each financial regulator (e.g., governing entity) of an asset transfer. For example, for the trading of dairy futures between Company A and Company B, the Chicago Mercantile Exchange (CME) may be the operating body of the transfer and the Commodity Futures Trading Commission (CFTC created by the Commodity Futures Trading Commission Act of 1974) may be the governing agency. In this instance, the parties may be Company A and Company B, and CME and CFTC may both be financial regulators. In another example, regarding a smart contract between cloud data service centers and service level agreements (SLA) regarding operational metrics, one regulator could be a technical service expert and an auditor may be a service administrator. Actual use cases may have different details as required by the participants, asset contracts, governing bodies, or other sources, which may be determined and set by the participants as discussed herein.

Due diligence requirements may depend on existing legal doctrine and how legal, political, and commercial institutions decide to treat the technology. In some instances, a regulating body is a government or oversight entity having the authority to regulate, tax, and/or govern specific actions.

In some instances, blockchain processes allow the performance of credible transactions which are trackable and irreversible. For example, if the transfer of cryptocurrency from the US to Germany through a Switzerland bank requires a fee to be paid to the Swiss government, a smart contract may be made where the final transfer may not be completed until the fee is paid. In some embodiments, the execution of many types of real world actions or transactions may involve the creation and completion of one or more blockchain processes. Further information on blockchain processes (e.g., smart contracts) can be found in FIG. 2A.

In some instances, compliance verification is an analytical method for the inspection and interrogation of data to determine whether data is compliant with a prescribed set of conditions referred to as rules herein. In some instances, compliance verification is centered on analysis of transactions and not on a state of the subject matter. For example, for a transfer of money, compliance verification may focus on how the money was transferred, not where it is after the transfer (e.g., focuses on transactions moving money to and from an account and not on the account balance itself).

In the context of blockchain, existing compliance verification methods focus on a post-recording analysis of data. For example, existing methods rely on a retrospective verification of transactions recorded in the ledger, with the goal to detect non-compliant records. This is done as a reactionary action to detect fault (e.g., when evidence of wrongdoing such as fraud is needed).

The present disclosure provides for a mechanism of compliance verification and enforcement prior to recording of operations (e.g., transactions, transaction proposals, smart contracts, and/or a processes performed on or with a blockchain network) to ledger. In some embodiments, this system may also provide a method of recording the due diligence steps that were taken to comply with the requirements of the governing agencies involved in the transactions in an immutable blockchain ledger. Unlike existing compliance methods, compliance verification and enforcement prior to recording of transactions to the ledger allows for proactive data compliance enforcement and elimination of non-compliant data, as opposed to retrospective compliance verification. By using compliance modules with sets of rules that apply across an entire ledger for all transactions, regardless of how many or which smart-contracts are deployed on a ledger, the mechanism may be external to the smart-contracts and therefor updated independently of the contracts while still recording compliance evidence into the ledger.

In some embodiments, the compliance mechanism may be distinctive from the functionality of the smart-contracts (which may also validate data as a part of a smart contract) in that the compliance mechanism uses a set of regulatory modules and dynamically configurable rules defined by internal and/or external authorities (e.g., financial authorities) to comport with compliance rules and regulations.

In some embodiments, an auditing mechanism may be distinctive from the functionality of the smart-contract in that the auditing mechanism (e.g., accounting mechanism) uses a set of auditing modules and dynamically configurable rules defined by designated auditors. In some embodiments, the designated auditors may be one or more peer nodes, an organization, and/or an outside firm. For example, an auditor may be a node (e.g., regulator 326) in an organization controlled by an auditing department. In some embodiments, auditors may be generally restricted to querying the network, but may be given authority to modify auditing modules. In some embodiments, auditors may be given access to the regulator modules and financial authorities may be given access to the auditing module. For example, regulator modules and auditing modules may need to work interconnectedly, may need similar information, and/or use similar processes. Thus, the auditing modules may access regulator modules and the regulator modules may access the auditing modules during execution (e.g., when used by a smart contract process).

In some embodiments, a method and system are provided for storing compliance data and/or auditing data on a blockchain network. In some embodiments, a method and system are provided to verify that data stored in the ledger is compliant with a set of compliance rules defined by external and/or internal authorities. In some embodiments, auditing may be the financial and operational structure of a business or transaction and may include bank account records, including bank statements, duplicate deposit tickets, debit/credit memos, and bank reconciliations, records for investments and all other assets, including inventories of fixed assets, receipts records, including duplicate receipts, receipt journals, and individual membership records (member ledger cards), disbursement records, including canceled checks, check stubs, disbursement journals, payroll ledgers, vouchers, expense receipts, bills, credit card statements, and other supporting documents, audit reports, if any, for the audit period prepared by union auditors or accountants retained by your union, minutes of executive board and membership meetings, a copy of the current constitution and bylaws and any financial policy documents, and other operational data.

In some embodiments, the system (e.g., computer system 501) may provide compliance verification and enforcement for regulatory, contractual, business, and other types of rules and laws. In some embodiments, one or more network peers (e.g., peers 281-283) may host a compliance verification and/or auditing verification component, which after a transaction is generated but before it is approved/endorsed, inspects the transaction and executes modules (e.g., program modules 530) to verify rules.

In some embodiments, if the system determines that all of the rules have been satisfied, the transaction is approved. In some embodiments, if the system determines that all of the rules have not been satisfied, the transaction may be rejected or marked noncompliant, and a further notification may be sent (e.g., an event, etc.) to a client.

In some embodiments, the method uses a set of pluggable modules (e.g., program modules 530) to dictate compliance policy and auditing policy for a given transaction. In some embodiments, the modules can be dynamically added or removed and configured. For example, the modules may be organized with Open Services Gateway Initiative (OSGI style).

In some embodiments, each module executes a set of rules, where the rules may evolve and be updated along with the network, regulations, business contracts, etc. Example, crypto currency asset transfers inside the united states may have specific rules and regulations as determined by the U.S. Securities and Exchange Commission (SEC). At the Federal level, the SEC generally has regulatory authority over the issuance or resale of any token or other digital asset that constitutes a security. Thus, the SEC may make a compliance module with rules for trading crypto currency.

In some embodiments, a module or rule may be applied to a specific asset type (or multiple asset types), commodity, service, or other subject of blockchain transactions. In some embodiments, multiple permitted authorities can add and modify the compliance module configurations and rules. Following examples from above, a trade of dairy futures for crypto currency may involve modules from the SEC, the CME, and the CFTC. A single operation (e.g., transaction) may require multiple regulator modules and/or multiple auditing modules.

In some embodiments, the network members (e.g., peers, or organizations) agree on the set of authorities which define the policy (or parts of policy) and the only allow rules from permitted authorities to be accepted (e.g., in the form of an access control). For example, members may agree on which authorities can define which types of rules and what rules are applicable to which types of transactions. The blockchain network may determine what regulator (e.g., the SEC) defines a set of requirements (e.g., compliance module) for financial transactions (e.g., 10k thresholds for tax approval, etc.) and what auditor defines the set of rules (e.g., auditing module) for tax compliance. In some embodiments, the outside authorities may provide modules that may be accepted by the blockchain network. In some embodiments, the network may receive a set of rules and form the rules into modules. For example, the network may receive a list of rules from an authority and may run the rules through a process to turn the rules into a module. In some embodiments, the network may modify a received module to function on the blockchain network. For example, the received module may need to be converted from one programing language to another in order to work with all smart contracts. In some embodiments, a node in the network may store the module for execution of an operation. For example, the module may be stored on distributed file storage 150, or may be stored on one or more nodes (e.g., nodes 102 and 105). Other methods of storage may be used.

In some embodiments, modules may contain verification logic and the rules defining what actions (e.g., financial compliance and auditing actions) need to be performed and how to verify that the actions were performed. In some embodiments, one or more blockchain nodes may verify that the proper compliance modules and auditing modules have been invoked. As described herein, smart contracts are digital contracts that may have one or more specific requirements for the completion of the smart contract. In some instances, a smart contract may be a computer protocol intended to digitally facilitate, verify, or enforce the negotiation or performance of a contract. Smart contracts will be used for exemplary purposes, however other types of blockchain processes may also be used.

In some embodiments, a compliance policy defines a set of modules and rules which are used to evaluate data and transactions for compliance. In some embodiments, after the compliance policy is enacted, the verified results may be recorded in the ledger.

Figure 6:
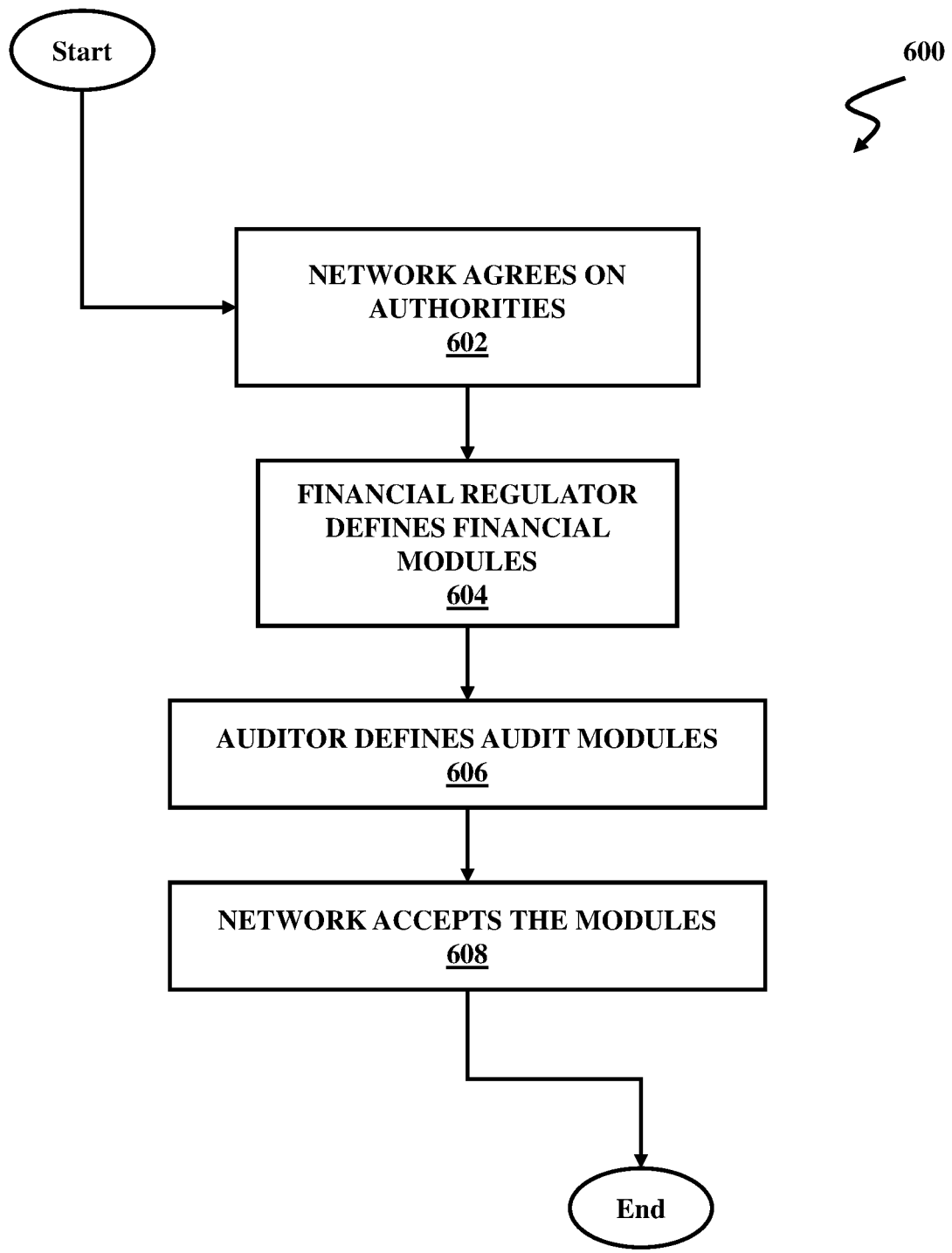
FIG. 6 illustrates a flow diagram of accepting compliance modules in a blockchain network, according to example embodiments.

Referring now to FIG. 6, illustrated is a flowchart of an example method 600 for accepting compliance modules in a blockchain network, in accordance with embodiments of the present disclosure. In some embodiments, the method 600 may be performed by a processor (e.g., processor 502 connected to the various components of FIG. 5) on a blockchain network or in communication with a blockchain network.

In some embodiments, the method 600 begins at operation 602, where components of a network agree on authorities to be used. In some embodiments, an authority may be a governing or regulating body, a node responsible for compliance, or another body which would provide or modify a compliance module (e.g., module containing compliance rules). The authorities may be determined by a permissioning mechanism. One permissioning mechanism may be an access control list, although those skilled in the art will recognize that there other possible permissioning mechanisms. Likewise, in some embodiments, the network may also agree on one or more auditors with the authorization to provide or modify an auditing module (e.g., module containing auditing rules). In some embodiments, the authority may be given with a permissioning mechanism, as described above. In some embodiments, the authority may be inherent in the system, a designated node, or regulator (such as regulator 326).

In some embodiments, the agreement on the authority or authorities may be recorded as an access control list. In some embodiments, the access control list may be recorded on the blockchain ledger. In some embodiments, a threshold authority agreement metric may be used to determine the access control list. For example, some networks may require that 100% of nodes or organizations agree an authority, a majority of nodes agree on an authority, or one or more controlling nodes must agree on an authority. In some embodiments, each node or organization may keep an access control list. For example, a node must agree on an authority before it may accept a compliance module from the authority. Other methods of creating and maintaining a control list will be apparent to one skilled in the art.

In some embodiments, the operators of the network, e.g., nodes or organizations may decide to change authorities and/or what authorities may have their privileges revoked. For example, if an organization is operating in a new country, the network may give an agency of the new country and revoke the authority of the old country.

In some embodiments, method 600 continues at operation 604 where the financial regulator defines a compliance module. In some embodiments, the compliance module may be a single module, multiple modules, or multiple interconnected modules. For example, each law may have an individual module and several modules may be required to comply with an agency's requirements. In another example, each agency may have a single module that contains all necessary compliance requirements for the agency. Other module configurations are possible.

In some embodiments, method 600 continues with operation 606 where an auditor defines auditing modules. In some embodiments, a single auditor may define a single auditing module or multiple modules, or multiple auditors may define a single module or multiple modules. For example, an outside accounting firm may provide a tax module and an internal accounting division may provide a general bookkeeping module.

In some embodiments, method 600 continues with operation 608 where the network accepts the modules. In some embodiments, the network may independently accept or deny each module. In some embodiments, there may be a scheme for accepting a module. For example, a particular percentage of nodes may be required to agree to a module before it may be accepted.

In some embodiments, participants of the network may be given the opportunity to accept or deny each module that may be submitted. For example, participants may determine if they would like to apply a particular compliance or accounting module. Some instances may have multiple compliance requirements or accounting options available. For example, there may be an accounting module for cryptocurrency tax and a module for stock trading tax.

Figure 7:
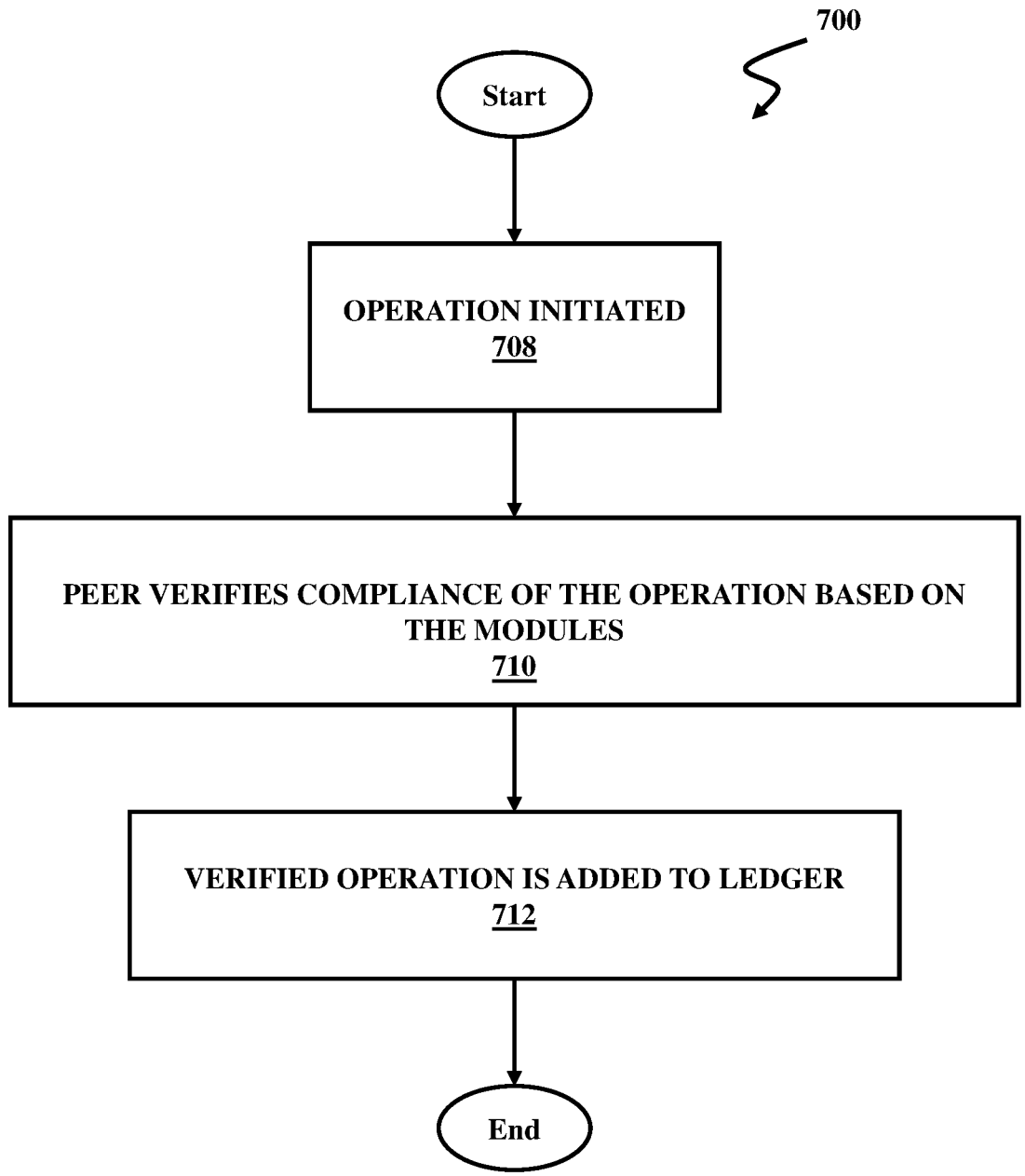
FIG. 7 illustrates a flow diagram of applying compliance modules and auditing modules to a blockchain operation, according to example embodiments.

Referring now to FIG. 7, illustrated is a flowchart of an example method 700 for applying compliance modules and auditing modules to a blockchain operation, in accordance with embodiments of the present disclosure. In some embodiments, the method 700 is performed by a processor on a blockchain network or in communication with a blockchain network.

In some embodiments, method 700 begins with operation 708 where an operation is initiated. In some embodiments, initiating an operation may be initiating a smart contract, initiating or submitting a transaction, creating or submitting a transaction proposal, etc. In some embodiments, the initiation includes a client invoking a smart contract and a peer generating the operation proposal (e.g., a transaction proposal). For example, the operation proposal may identify what actions or changes that the smart contract may perform. In some embodiments, the rules in the modules or the modules may be matched to blockchain operations (such as transactions) and data based on specific conditions such as asset types, transaction types, and transaction submitters. In some embodiments, the system may identify asset types and select one or more modules for the selected asset type. For example, the system may leverage schema or type identification patterns such as regular expression (regex). In some embodiments, the system may identify transaction types and match them to specific modules. The transaction types may be identified with transaction metadata/attributes (function, chaincode, etc). For example, dairy trading may need to invoke modules for the Chicago Mercantile Exchange and the Commodity Futures Trading Commission. In some embodiments, the modules/rules may also be selectively applied based on identity of the transaction submitter. For example, a client that deals in crypto currency trading may need to invoke modules from the U.S. Securities and Exchange Commission.

In some embodiments, the initiation may come from one or more parties participating in the request, or it may come from a third party (e.g., a mediator in a settlement agreement, or a broker for a real estate deal). For example, company A may be using mediator M to handle the asset transfer contract/details and mediator M may create the operation.

In some embodiments, the initiation may include information related to the operation such as a list of terms in an agreement related to the asset transfer, a list of agents (e.g., a bank, a broker, a firm, a mediation organization, a representative, etc.) that may be representing either party in the transfer, a list of organizations or agents (e.g., a bank, a broker, a firm, a mediation organization, a representative, etc.) that may be facilitating the transfer of the digital assets, locations or jurisdictions for the agents, the type of assets to be transferred, and other information relating to the transfer. For example, the digital asset transfer request may include information such as, company A location, company B location, mediator M location, and operational details such as company A may transfer 100 exempli gratia dollars (fictional crypto currency) through bank S to company B. In some embodiments, the request may contain the data or a location of data in a distributed file storage. In some embodiments, some or all of the data may be contained in digital constructs (such as digital contracts) on various blockchain networks. For example, in a simple two-party contract, each party may create a digital contract, where each contract contains the terms of the agreement that are important to the drafting party. Other possible ways of initiating an operation are possible. Once the operation is initiated, the method may continue to operation 710.

In some embodiments, method 700 continues with operation 710 where a peer verifies compliance of the operation based on one or more modules. In some embodiments, when evaluating an operation, the verification component(s) may: determine if the modules/rules are the correct modules/rules for the operation, determine if the correct rules are included in the modules, and/or validate that the modules will work on all nodes for the operation (e.g, transaction or smart contract). For example, for a financial transaction, both a state and a federal module may need to be selected. If only a federal module is selected, the peer may either reject the operation or retrieve the proper state module. In some embodiments, the validating may include determining if all the nodes are capable of running the smart contracts with the modules. In some embodiments, the smart contract may have a verification component or the network may have a verification component to comply with the system. In some embodiments, the verification may be performed based on the content of the modules. For example, the modules may have one or more verification steps/rules included.

In some embodiments, the peer may verify that the proper modules have been selected for each operation. For example, nodes with varying requirements or qualifications may be required to validate that the proper modules/rules were invoked. In some embodiments, the peer may verify that the modules will work properly with each other and with the smart contract. For example, if a compliance module requires a tax be held in reserve before a transaction, but the auditing module does not hold tax in reserve, the modules may not be compatible. In another example, if a compliance module requires that both state and federal tax be withheld from a financial transaction, but the auditing module only has a rule for a federal module, the peer may reject the transaction and send a notice to the client.

In some embodiments, the peer may generate a compliance statement or proof based on the verification of the operation. The compliance statement may reference each module that the operation was verified against and or each rule the operation proposal was verified against. For example, if an operation proposal was verified with a module from the SEC, the compliance statement or proof may reference an SEC module. In some embodiments, the compliance statement may also include statements on how the requirements for each rule were satisfied. For example, if an operation proposal was verified with a module from the SEC, the compliance statement or proof may list how each rule in the SEC module was comported with. In some embodiments, these compliance statement or proof may be available on the ledger for review by authorities, as described in operation 712.

In some embodiments, method 700 continues with operation 712 where the verified operation may be processed according to the procedure of the blockchain network and/or formal proof of compliance may be recorded on the ledger.

In some embodiments, a transaction may require a formal compliance statement or proof of compliance. In some instances, the proof may be constructed as a statement by endorsers (e.g., a representation of a set of verified rules) where the statement includes validation of one or more types of data in context of the transaction. For example, the data may include: the output data of the transaction (e.g., write-set), the values of any of the arguments used to invoke the transaction generation, and/or data which may be explicitly not intended to be recorded in the transaction but may be needed to establish the validity of the content or compliance with rules or laws. For example, the transaction may contain a hash of a document. To validate the document, the compliance requires the reviewer to "see" the document and to calculate its hash to verify the hash validity and, hence, the document's validity.

In some embodiments, the proof may contain documentation that the validation component (e.g., system chaincode) was invoked with all available data related to the validation (e.g., how each rule was comported with).

In some embodiments, the validation components component may be invoked in an individual, or each, compliance module, and a proof may be provided for the individual module, or each module. In some embodiments, a module, or each module, executes set of preconfigured rules in the context of the processed transaction that may act as the validation component.

In some embodiments, the statement may be included in the transaction header as a proof of validation. In some embodiments, the use of the statement may provide proof that the compliance policy was applied/evaluated. In some embodiments, the proof may also demonstrate that all peers approved the proof, since the proofs between various peers must match before the proof can be applied to the blockchain network. The proof may then be used by the auditors to check whether and which rules were applied.

Figure 8:
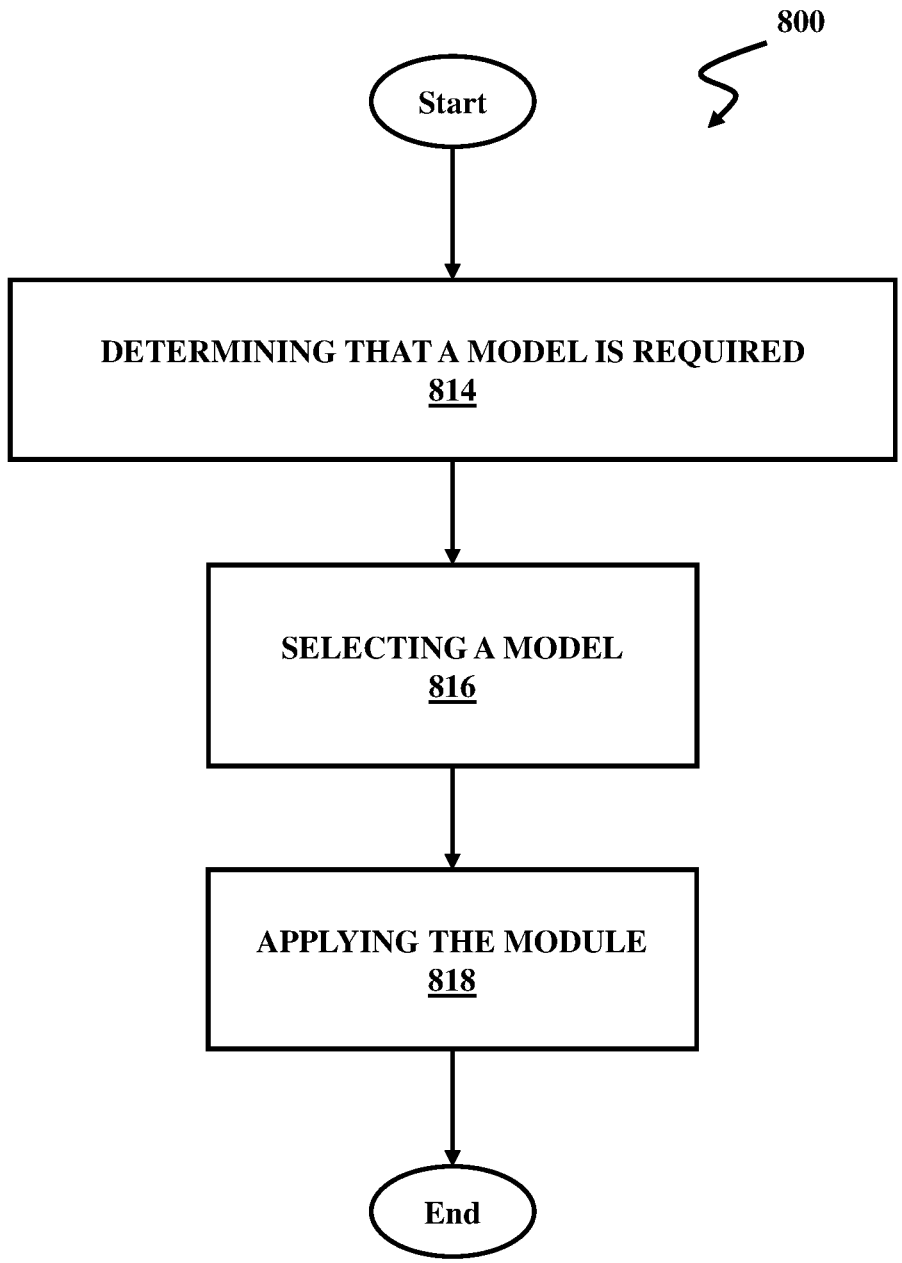
FIG. 8 illustrates a flow diagram depicting the inception, selecting, and processing of a module.

Referring now to FIG. 8, illustrated is a flowchart of an example method 800 depicting the inception, selecting, and processing of a module, in accordance with embodiments of the present disclosure. In some embodiments, the method 800 is performed by a processor on a blockchain network or in communication with a blockchain network.

In some embodiments, method 800 begins with inception in operation 812, where it is determined that a module is required. In some embodiments, the operation may have an indication that there is a regulatory or auditing requirement. For example, a transaction may indicate that a specific module or code of laws may need to be referenced. In some embodiments, the verification process (e.g., operation 710) may include one or more checks for a module (e.g., regulatory module or auditing module). For example, the system may run a check to determine if there is, or should be, a module every time a financial transaction takes place. In some embodiments, the verification may determine jurisdictional requirements for every operation. For example, the system may look to determine if there is a body of law for each location where a part of the operation takes place. In some embodiments, the system may require a module be applied for every transaction. For example, a blockchain network processing crypto currency transactions for a company based in the US may always require that modules from the U.S. Securities and Exchange Commission are invoked.

In some embodiments, method 800 continues with operation 814 where a module is selected. In some embodiments, the operation or system instructions may contain a direct indication of what module to use. For example, a crypto operation may contain instructions to invoke U.S. Securities and Exchange Commission module 405B (fictional example). In some embodiments, the system may use an identification process to determine likely modules. For example, the system may examine all jurisdictions of a transaction and pull in modules for any controlling agencies.

In some embodiments, method 800 continues with operation 814 where the model is applied. In some embodiment, the application is similar to operations 710 and 712. In some embodiments, specific modules may be applied to specific parts of an operation. For example, a compliance module may be applied to a method of a financial transaction, and an auditing module may be applied to a tax section of a financial transaction. In another example, a U.S. compliance module may be applied to the U.S. portion of a transaction, and a Swedish compliance module may be applied to the Swedish portion of a transaction.

What is claimed is:

1. A method comprising:
   agreeing, by a node in a blockchain network, on an authority;
   receiving, by the node, a compliance module from the authority;
   accepting, by the node, the compliance module;
   receiving an operation;
   storing, by the node, the compliance module for execution of the operation on the blockchain network;
   verifying a compliance of the operation based on the compliance module and an auditing module; and
   adding the verified operation to a ledger on the blockchain network.

2. The method of claim 1, further comprising:
   verifying the compliance of the operation based on the compliance module by calculating a second hash of a document; and
   comparing the second hash of the document against a first hash of the document stored on the blockchain network.

3. The method of claim 2, further comprising:
   determining compliance information based on the verifying;
   recording compliance information on the ledger.

4. The method of claim 1 further comprising:
   receiving, by the node, the auditing module from an auditor;
   accepting, by the node, the auditing module.

5. The method of claim 1 further comprising:
   determining, based on the verifying, auditing information;
   submitting the auditing information to be recorded on the ledger.

6. The method of claim 5, further including:
   determining a capability of all nodes in the blockchain network to process the operation with the compliance module and the auditing module.

7. A system comprising:
   a memory; and
   a processor in communication with the memory, the processor being configured to perform processes comprising:

agreeing on an authority for a blockchain network;
receiving a compliance module from the authority; and
accepting the compliance module;
receiving an operation;
storing the compliance module for execution of the operation on the blockchain network;
verifying a compliance of the operation based on the compliance module and an auditing module; and
adding the verified operation to a ledger on the blockchain network.

8. The system of claim 7, wherein the processes further comprise:
verifying the compliance of the operation based on the compliance module by calculating a second hash of a document; and
comparing the second hash of the document against a first hash of the document stored on the blockchain network.

9. The system of claim 8, wherein the processes further comprise:
determining compliance information based on the verifying;
recording compliance information on the ledger.

10. The system of claim 7 wherein the processes further comprise:
receiving the auditing module from an auditor;
accepting the auditing module.

11. The system of claim 7 wherein the processes further comprise:
determining, based on the verifying, auditing information;
submitting the auditing information to be recorded on the ledger on the blockchain network.

12. The system of claim 11, wherein the processes further comprise:
determining a capability of all nodes in the blockchain network to process the operation with the compliance module and the auditing module.

13. A computer program product comprising a computer readable storage medium having program instructions embodied therewith, the program instructions executable by a processor to cause the processors to perform a function, the function comprising:
agreeing on an authority for a blockchain network;
receiving a compliance module from the authority;
accepting the compliance module;
receiving an operation;
storing the compliance module for execution of the operation on the blockchain network;
verifying a compliance of the operation based on the compliance module and an auditing module; and
adding the verified operation to a ledger on the blockchain network.

14. The computer program product of claim 13, further comprising:
verifying the compliance of the operation based on the compliance module by calculating a second hash of a document; and
comparing the second hash of the document against a first hash of the document stored on the blockchain network.

15. The computer program product of claim 14, further comprising:
determining compliance information based on the verifying;
recording compliance information on the ledger.

16. The computer program product of claim 13 further comprising:
receiving the auditing module from an auditor;
accepting the auditing module.

17. The computer program product of claim 13 further comprising:
determining, based on the verifying, auditing information;
submitting the auditing information to be recorded on the ledger.

* * * * *